Oct. 27, 1970          C. T. ROTH ET AL          3,536,485
XEROGRAPHIC PLATE SUPPORTED BY A MANDREL
Original Filed July 1, 1965          4 Sheets-Sheet 2

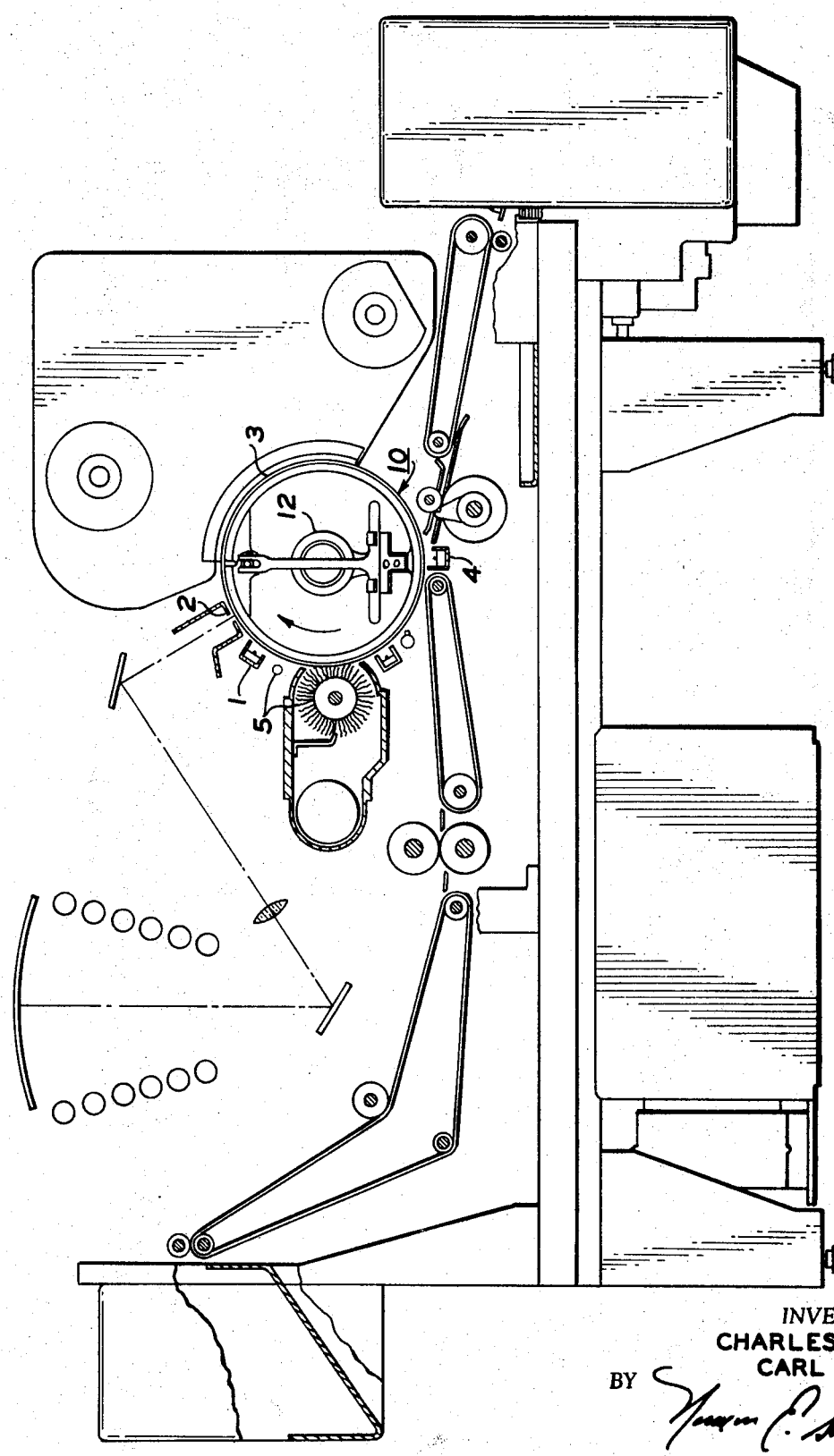

INVENTOR.
CHARLES T. ROTH
CARL E. SMITH
BY
ATTORNEYS

INVENTOR.
CHARLES T. ROTH
CARL E. SMITH

ATTORNEYS

INVENTOR.
CHARLES T. ROTH
CARL E. SMITH

ATTORNEYS

United States Patent Office 3,536,485
Patented Oct. 27, 1970

3,536,485
XEROGRAPHIC PLATE SUPPORTED BY A MANDREL
Charles T. Roth, Webster, and Carl E. Smith, Rochester, N.Y., assignors to Xerox Corporation, Rochester, N.Y., a corporation of New York
Continuation of application Ser. No. 468,839, July 1, 1965. This application July 2, 1969, Ser. No. 845,608
Int. Cl. G03g 13/22, 15/00; B60b 7/00
U.S. Cl. 96—1.5
4 Claims

ABSTRACT OF THE DISCLOSURE

A cylindrically shaped xerographic sleeve and a mandrel. The mandrel has an axial slot extending the length thereof so that associated cam means may contract it. When the sleeve is placed over the mandrel and the cam means released, the cylinder will expand to retain the sleeve in cylindrical configuration. A single support web located inside the mandrel and diametrically opposed to the slot permits the symmetric contraction and expansion of the cylinder.

---

This application is a continuation of our copending application Ser. No. 468,839, filed July 1, 1965, and now abandoned.

This invention relates to xerographic plate construction and in particular to cylindrical xerographic plates.

More specifically, the invention relates to a new cylindrical xerographic plate including a support cylinder having a peripheral surface capable of being contracted to facilitate replacement of a thin outer sleeve bearing photoconductive material.

Prior xerographic plates have been manufactured by machining a large casting to the proper diameter within precise tolerances. A photoconductive film is subsequently applied to the casting to achieve the necessary high degree of precision required for proper sealing of the developer system, proper focusing of the optical system, and proper operation of the corotron charging devices. Although these prior xerographic plates reproduce a large volume of high quality images before replacement is required, due to the substantial usage of xerographic machines wherein a reusable xerographic plate is employed an appreciable amount of savings may be realized by employing a special expandable support cylinder as an integral part of the machine to allow the replacement of a substantially less expensive outer sleeve of photoconductive material.

The new cylindrical xerographic plate of this invention is of the high degree of precision to enable it to be passed through the various xerographic processing stations to achieve the necessary high quality print reproductions. In the event the precise degree of concentricity is not achieved, the corotron charging unit does not uniformly charge the photoconductive surface resulting in a poor quality latent image when the surface is subsequently exposed to the original document to be reproduced and an error in the precise concentricity of the thin photoconductive sleeve results in the improper sealing of the developer system allowing toner particles to escape creating a dusty toner-laden atmosphere. These triboelectrically charged toner particles, if allowed to escape from the developer system, cling to various components of the xerographic reproducing apparatus resulting in unsatisfactory operation. In addition, if the thin photoconductive sleeve is not of the precise concentricity required, the transfer corotron used in transferring the developed electrostatic image from the xerographic plate to the support material does not function properly resulting in an incomplete image being transferred to the support sheets. The precise degree of accuracy required for use in an automatic xerographic reproducing machine has been achieved in this new invention. The thin photoconductive sleeve included in this invention reproduces a large volume of high quality images before replacement is required.

This invention departs radically from previous xerographic plates in that a thin sleeve bearing photoconductive material is mounted on an expandable support cylinder which is an integral part of the xerographic reproducing machine. The invention eliminates the need for a casting blank and allows complete disposability of the sleeve itself.

It is, therefore, an object of this invention to reproduce a large volume of high quality xerographic images on an inexpensive replaceable photoconductive sleeve.

A further object of this invention is to improve xerographic plate construction in a manner to permit ready replacement of the photoconductive surface thereon.

For a better understanding of the invention, as well as further objects and features thereof, reference is had to the following detailed description of the invention to be read in connection with the accompanying drawings, wherein:

FIG. 1 illustrates schematically an automatic xerographic reproducing apparatus utilizing an embodiment of the subject invention;

Figure 3:
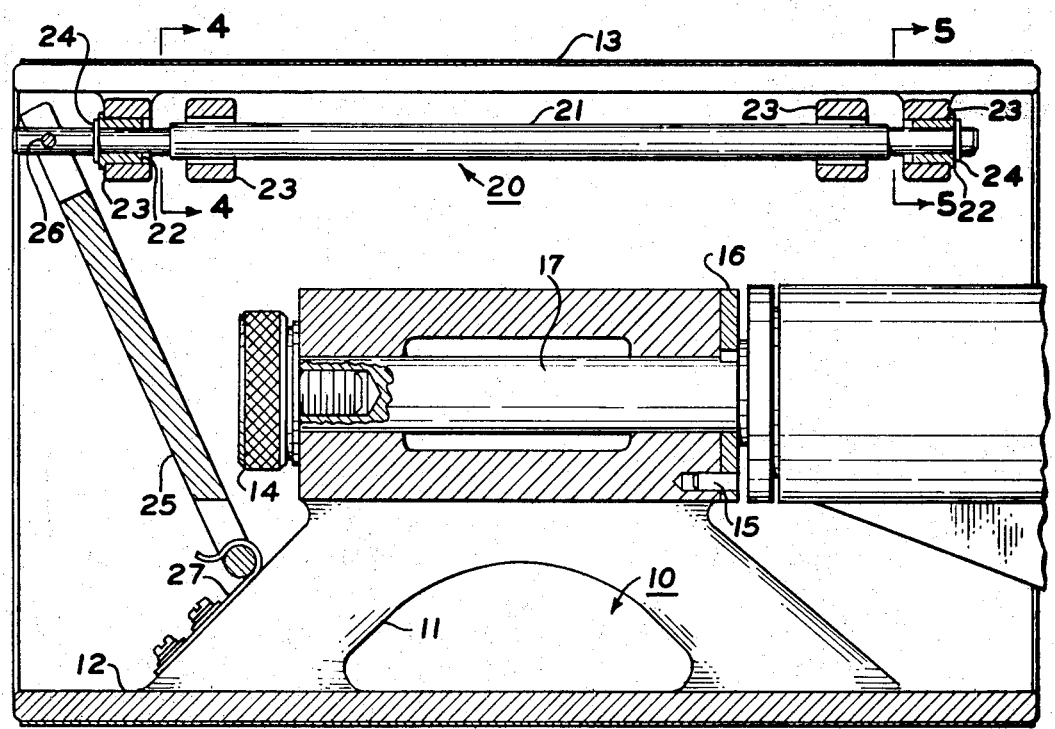
FIG. 3 is a cross-section view taken along section 3—3 of FIG. 2.
Figure 4:
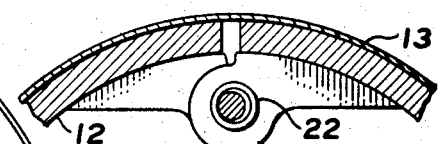
Figure 5:
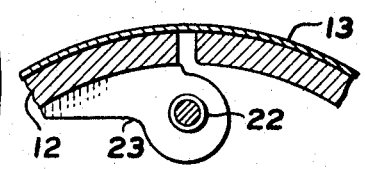
Figure 6:
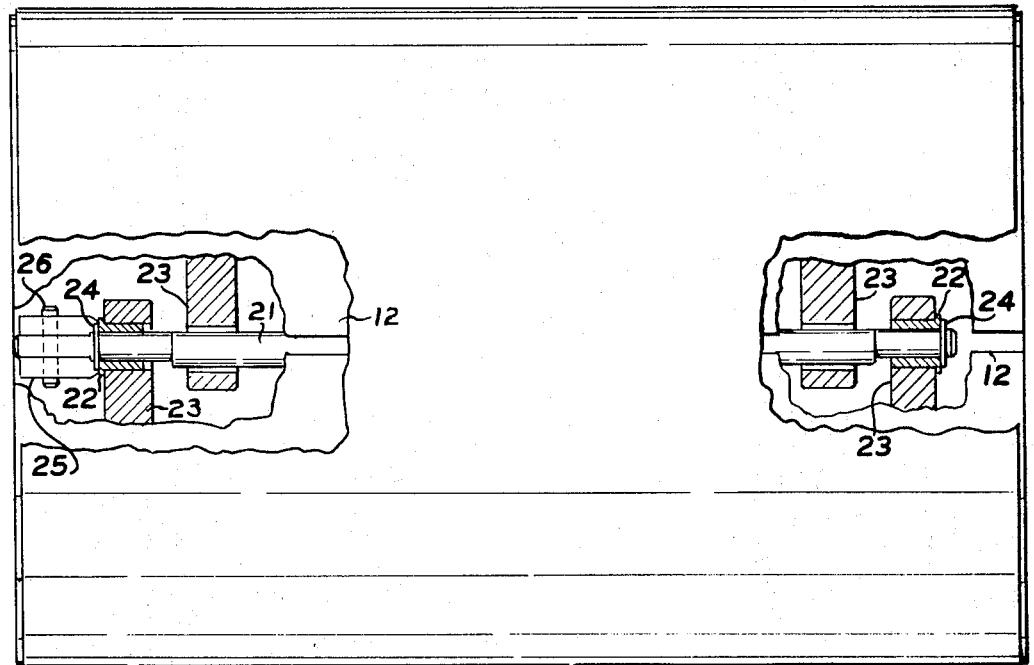
Figure 9:
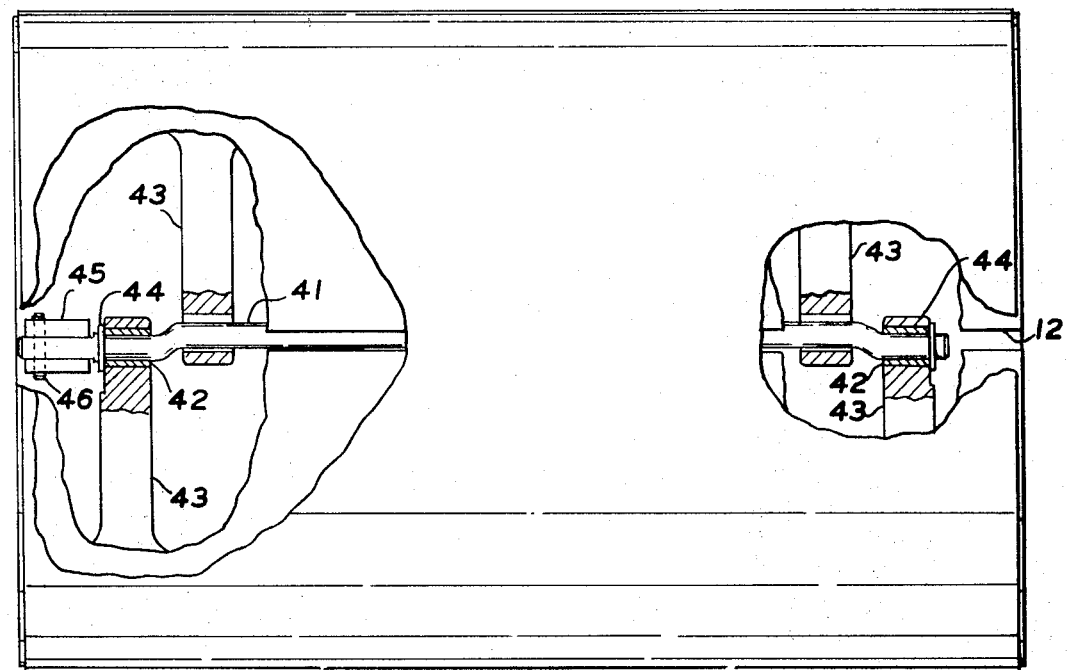
Figure 8:
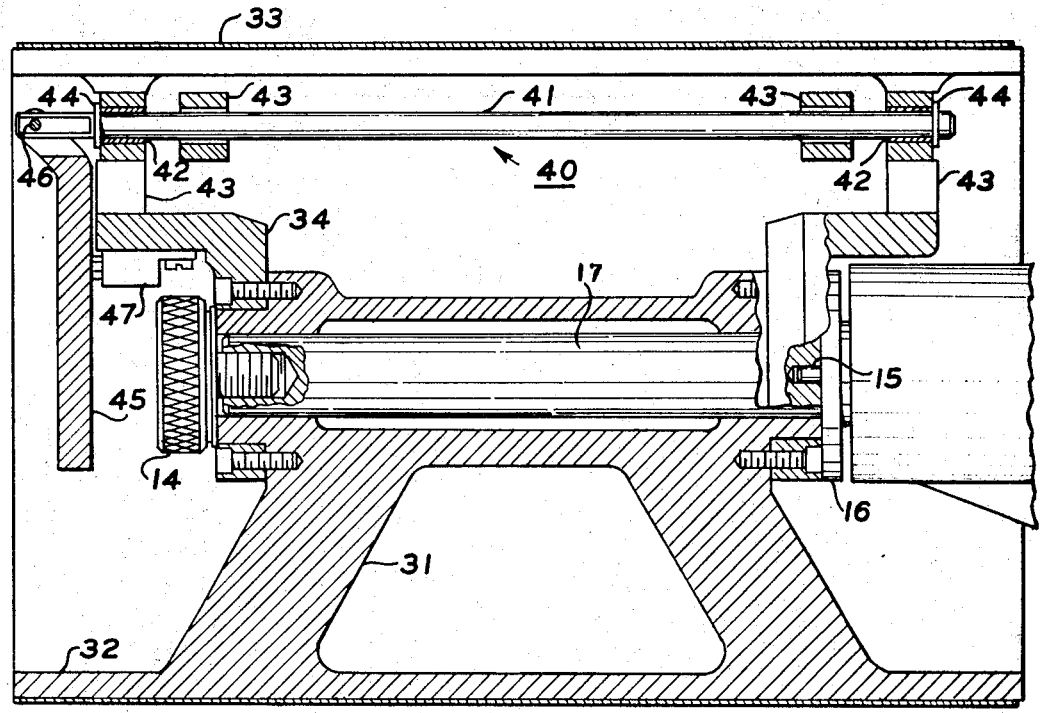
Figure 7:
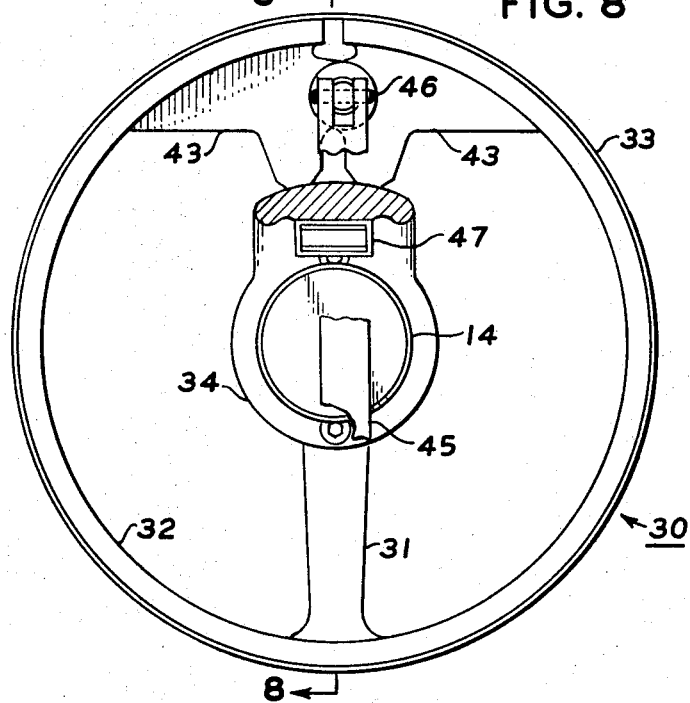

FIGS. 4 and 5 are section views taken along section 4—4 and 5—5, respectively, of FIG. 3 showing a portion of the means for contracting the support cylinder;

FIG. 6 is a horizontal view of one embodiment of the subject invention with parts broken away to better illustrate the cam means for contracting the support cylinder;

FIG. 7 is an end view of an alternate embodiment of the subject invention with parts broken away to better illustrate the apparatus;

FIG. 8 is a cross-section view taken along section 8—8 of FIG. 7;

FIG. 9 is a horizontal view of one embodiment of the subject invention with parts broken away to better illustrate the cam means for contracting the support cylinder.

Referring now to the drawings, there is shown in FIG. 1 an embodiment of the subject invention in a suitable environment such as an automatic xerographic reproducing machine of the type disclosed in copending application Ser. No. 400,363, by John W. Melville et al. filed Sept. 30, 1964, although it should be noted that the invention may be applied to any type of xerographic reproducing machine in which a reusable plate is employed.

As shown schematically in FIG. 1, the automatic xerographic reproducing apparatus includes a xerographic plate 10, in the form of one embodiment of the invention, including a photoconductive layer or light receiving surface on a conductive backing and supported on a cylinder 12 which is mounted on a shaft journaled in a frame to rotate in the direction indicated by the arrow to cause the drum surface sequentially to pass a plurality of xerographic processing stations.

For the purpose of the present disclosure, the several xerographic processing stations in the path of movement of the plate surface may be described functionally, as follows:

A charging station 1 at which a uniform electrostatic charge is deposited on the photoconductive layer;

An exposure station 2 at which a light or radiation pattern of copy to be reproduced is projected onto the plate surface to dissipate the charge in exposed areas thereof and thereby form a latent electrostatic image of the copy to be reproduced;

A developing station 3 at which a xerographic developing material including toner particles having an electrostatic charge opposite to that of the electrostatic latent image are cascaded over the plate surface whereby the toner particles adhere to the electrostatic latent image to form a xerographic powder image in the configuration of the copy being reproduced;

A transfer station 4 at which the xerographic powder image is electrostatically transferred from the plate surface to a transfer material or a support surface; and A drum cleaning and discharge station 5 at which the plate surface is brushed to remove residual toner particles remaining thereon after image transfer, and at which the drum surface is exposed to a relatively bright light source to effect substantially complete discharge of any residual electrostatic charge remaining thereon.

Figure 2:
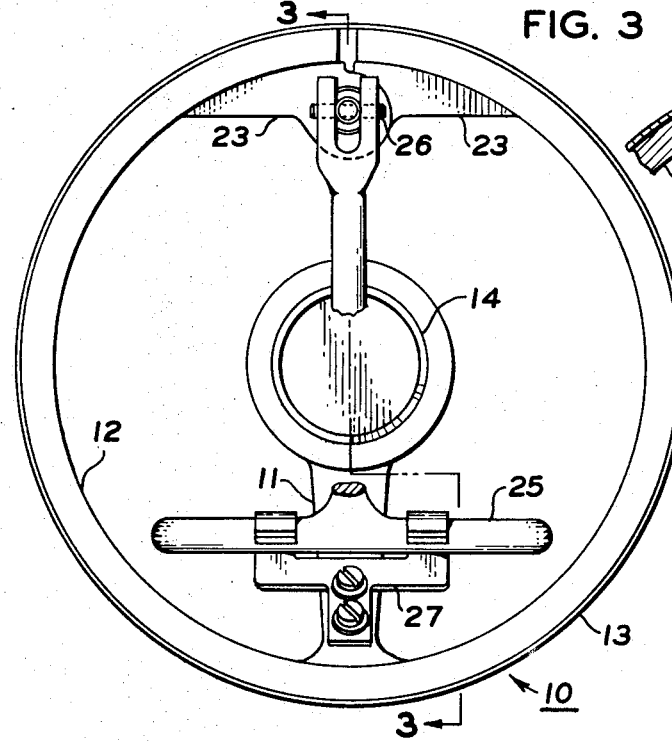
FIG. 2 is an end view of the subject invention with parts broken away to better illustrate the construction thereof.

It is felt that the preceding description of the xerographic process is sufficient for a better understanding of this invention. Referring now to the subject matter of the invention, the expandable support cylinder is manufactured by slotting a rough cylindrical casting. This type of casting is referred to as the "clam shell" design. The heavy-walled, cylindrical casting is centrally supported by a single web 11 or 31, shown in the two embodiments of FIGS. 2 and 7, respectively, to one side of the cylinder; the diametrically opposite wall is split to form a symmetrical cantilever shell. The slotted cylinder is then clamped together by steel bands forming a closed peripheral surface. The banded cylinder is then machined to the proper diameter and eccentricity whereby upon release of the clamps the natural resiliency of the material will spring the cylinder to the proper diameter. When the photoconductive sleeve is placed in position and the support cylinder allowed to expand, the resulting xerographic plate will be the precise diameter and concentricity required.

Referring now to FIG. 3, the expandable support cylinder 12 upon which the photoconductive sleeve 13 is mounted is concentrically secured, as by a thumb screw 14 threaded into the free end of the shaft 17 and a driving pawl 15 of drive connector 16 interlocking with a suitable recess in the expandable cylinder, to rotate with drive shaft 17, journaled in a suitable frame whereby the photoconductive sleeve 13 is held in rigid spaced relationship with the components if the xerographic reproducing machine, as shown in FIG. 1, and advanced past the various xerographic processing stations.

The outer diameter of the expandable support cylinder 12 is contracted to receive the photoconductive sleeve 13 by cam means 20, shown as an eccentric shaft 21 in this embodiment. The shaft is journaled parallel to drive shaft 17 for rotation in the bearings 22 and bosses 23 in the expandable support cylinder 12 and axially secured by snap rings 24 positioned in grooves provided in the shaft 21. In the embodiment shown in FIG. 2, the shaft is rotated by a lever 25 having a bifurcated end secured to the shaft by pin 26 and retained when not in use by a handle clip 27 attached to the expandable core.

The photoconductive sleeve 13 is concentrically mounted on the expandable support cylinder 12 by contracting the cylinder through operation of the lever 25. The sleeve is held in the proper shape and alignment by the interference fit between the inner diameter of the sleeve 13 and the outer diameter of the resilient expandable support cylinder 12.

FIGS. 7, 8 and 9 show an alternate form of embodiment of applicant's invention.

The cylindrical xerographic plate 30 includes the photo-conductive sleeve 33 concentrically secured on the expandable support cylinder 32 for rotation with drive shaft 17 as by means heretofore described. The expandable cylinder is manufactured as previously disclosed forming a "clam shell" support cylinder. The expandable support cylinder shown in this embodiment is cast with internal bosses 43 in which the cam means 40 shown in FIG. 8 as an offset shaft 41 parallel to the drive shaft 17 rotatably journaled in bearings 42 and bosses 43 and secured by snap rings 44 on shaft 41. Left and right-hand support collars 34 and 35, respectively, are secured to the expandable cylinder concentrically with drive shaft 17 forming bearing plates for internal bosses 43 to provide a more nearly uniform reduction in the diameter of the expandable cylinder when the cam means 40 is rotated as by a lever 45 attached to a bifurcated shaft 41 by a pin 46 and securable, when not in use, to the expandable support cylinder by a suitable handle clip 47 shown in FIG. 7 as a magnetic latch secured to left-hand support collar 34.

While the invention has been described with reference to the structures disclosed herein, it is not confined to the details set forth; and this application is intended to cover such modifications or changes as may come within the purpose of the improvements or the scope of the following claims.

What is claimed is:

1. For use in a reproducing machine, a xerographic plate including:
   a flexible cylindrical sleeve formed of an electrically conductive material with a layer of a photoconductive material and
   a mandrel for supporting said sleeve, said mandrel having a circumference substantially equal to the circumference of said sleeve and being formed with an axial slot in the surface thereof, said mandrel being provided with a support web interior thereof, said mandrel being resiliently urged to a circumference greater than that of said sleeve and means on said mandrel movable to a first position against the resiliency of said mandrel to reduce the size of said slot and thereby decrease the circumference of said mandrel so that a sleeve may be placed thereover, said last mentioned means also being movable to a second position whereby the size of said slot is enlarged by the resiliency of said mandrel to securely hold the sleeve thereon in a cylindrical configuration.

2. The xerographic plate as set forth in claim 1 wherein said support web is positioned in said mandrel diametrically opposed to said slot so that movement of the edges of said mandrel adjacent said slot causes the symmetric contraction and expansion of the entire mandrel about an area adjacent said support web.

3. The xerographic plate as set forth in claim 1 wherein the movable means includes a pair of support collars on said mandrel on opposite sides of said slot and camming means cooperating with said support collars to cause the enlarged and reducing in size of said slot.

4. For use in a reproducing machine, a xerographic plate including:
   a flexible cylindrical sleeve formed of an electrically conductive material with a layer of a photoconductive material thereon and
   an electrically grounded mandrel for supporting said stantially equal to the circumference of said sleeve and being formed with an axial slot in the surface thereof, said mandrel being resiliently urged to a circumference greater than that of said sleeve and a support web interior of said mandrel and position on said mandrel diametrically opposed to said slot so that movement of the edges of said mandrel adjacent said slot causes the symmetric contraction and expansion of the entire mandrel about an area adjacent said support web, pairs of support collars on said mandrel on opposite side of said slot adjacent the ends thereof, camming means rotatable to a first position to move said support collars and the edges of said mandrel against the resiliency of said mandrel to reduce the size of said slot and thereby decrease the circumference of said mandrel so that said sleeve may be placed thereover, said camming means also being rotatable to a second position whereby the size of said slot is enlarged by the resiliency of said mandrel to securely hold the sleeve thereon in a cylindrical configuration, and handle means pivotally mounted on one end of said camming means about an axis within said mandrel, said handle being pivotable on said axis between an inoperative position wherein said handle is contained within said mandrel and an operative position wherein said handle is located outside of said mandrel to permit the rotating of said camming means about an axis transverse to said first mentioned axis.

References Cited
UNITED STATES PATENTS

| | | |
|---|---|---|
| 209,349 | 10/1878 | McEachern. |
| 668,107 | 2/1901 | Loscher. |
| 819,578 | 5/1906 | McCoy. |
| 1,000,261 | 8/1911 | Hansen. |
| 1,093,284 | 4/1914 | Mehlum. |
| 1,131,529 | 3/1915 | Leicht. |
| 2,825,814 | 3/1958 | Walkup. |
| 2,830,114 | 4/1958 | Carlson. |
| 2,573,881 | 11/1951 | Walkup et al. |
| 2,784,694 | 3/1957 | Crumrine et al. |
| 3,002,705 | 10/1961 | Isbell. |
| 3,253,323 | 5/1966 | Saueressig. |
| 3,337,998 | 8/1967 | Greenfogel. |

GEORGE F. LESMES, Primary Examiner

J. C. COOPER III, Assistant Examiner

U.S. Cl. X.R.

355—3; 242—72; 29—118, 129; 101—415.1, 375, 378; 51—372.5, 381